F. A. STANLEY.
STOP AND DRAIN COCK.
APPLICATION FILED MAY 19, 1909.
978,952.
Patented Dec. 20, 1910.
2 SHEETS—SHEET 2.
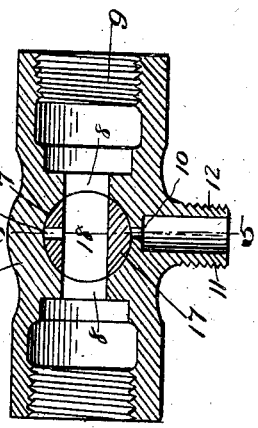
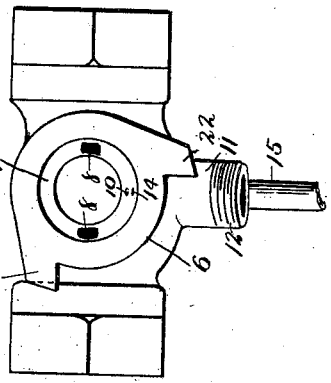
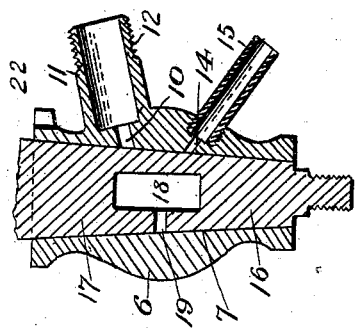
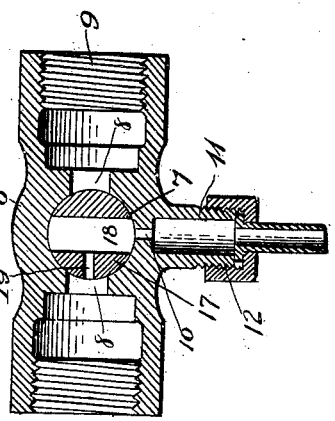
Witnesses
F. L. Ourand.
P. C. Trott.
Frank A. Stanley Inventor
By John S. Duffie
Attorney

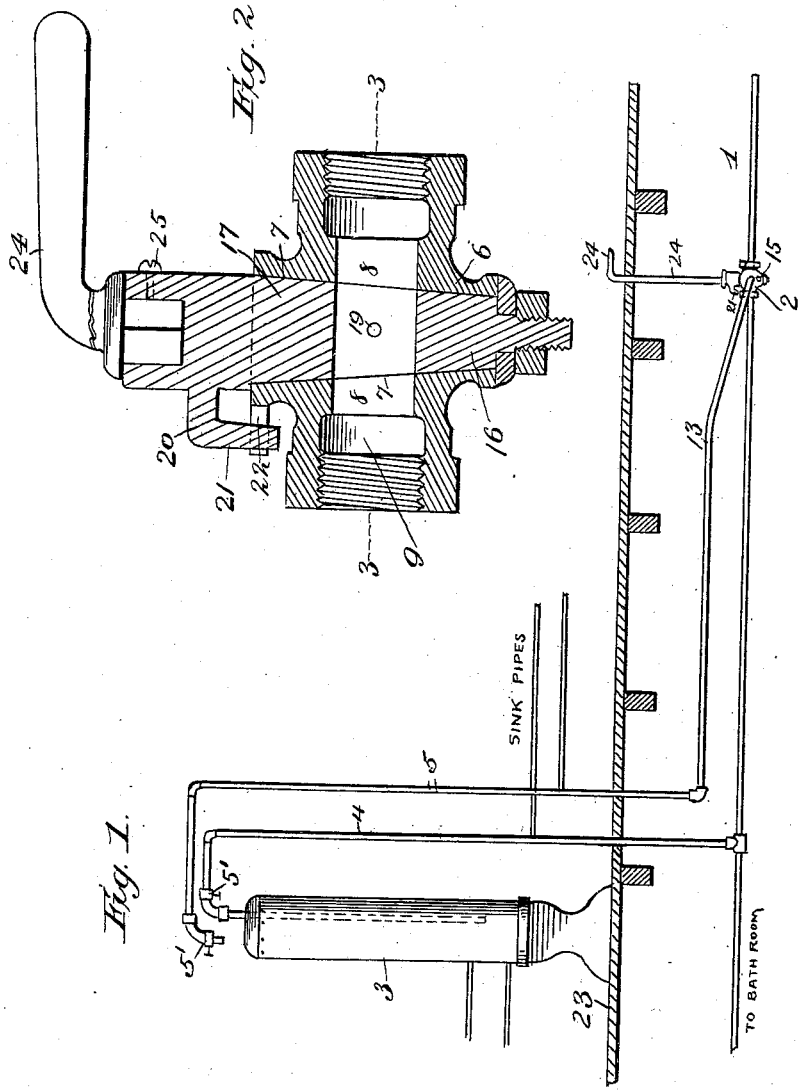

UNITED STATES PATENT OFFICE.

FRANK A. STANLEY, OF LITTLE ROCK, ARKANSAS.

STOP AND DRAIN COCK.

978,952. Specification of Letters Patent. Patented Dec. 20, 1910.

Application filed May 19, 1909. Serial No. 496,874.

*To all whom it may concern:*

Be it known that I, FRANK A. STANLEY, a citizen of the United States, residing at Little Rock, in the county of Pulaski and State of Arkansas, have invented certain new and useful Improvements in Stop and Drain Cocks, of which the following is a specification.

My invention relates to new and useful improvements in stop and waste cocks, and has for its principal object the production of a simple and efficiently operating device of this kind, adapted for ready attachment to the service or supply pipe, whereby the supply of water to a house may be cut off at will and both the hot and cold water pipes drained of the waste water through the employment of but one stop or waste cock.

With the foregoing and other objects in view, that will readily appear as the nature of the invention is better understood, the same resides in the novel features of construction, combination and arrangement of its parts illustrated in the accompanying drawings and particularly pointed out in the appended claim.

In the accompanying drawings, Figure 1, is a view in side elevation, illustrating the application of the invention, the service pipe as well as the hot and cold water pipes being shown conventionally. Fig. 2, is a central longitudinal sectional view of the invention, the revoluble valve member or plug being shown in one of its positions. Fig. 3, is a horizontal section, taken on the plane indicated by the dotted lines 3—3 of Fig. 2. Fig. 4, is a similar view, the valve member or plug being shown in its other position. Fig. 5, is a central transverse sectional view, on the line 5—5 of Fig. 3. Fig. 6, is a detail plan view of the valve casing.

In the embodiment illustrated, which is for illustrative purposes only and therefore not drawn to scale, the numeral 1 indicates the service or supply pipe, the same being represented as extending through the basement of the building, and 2, the improved stop and waste cock, arranged at a suitable point of the supply pipe.

The numeral 3 indicates the boiler, which may be of any desirable pattern and which is conventionally shown only, as it does not constitute a part of the invention.

A cold water pipe 4, is shown for establishing communication between the service or supply pipe 1, and the boiler, and a hot water pipe 5 is shown leading from a suitable source to the waste pipe 13, valves 5' of any ordinary or approved type being arranged in said pipes to control the passage of the water through either pipe as desired.

This cock comprises a two way casing 6, the vertical bore 7 of which is of decreasingly-tapered form from its outer end, the wall of said bore being slotted longitudinally at diametrically opposite points, as at 8, to form openings for effecting communication between the tapered bore and the straight longitudinal bore 9, of the casing. The wall of the tapered bore is also provided at a suitable point, preferably at a point midway between said openings and near its larger end, with an inlet port or opening 10. An outwardly projecting tubular stem 11, is formed on the outer face of the casing in position to communicate with said inlet port or opening 10, said stem being formed with an exterior thread 12, to adapt it for engagement with the waste pipe 13 which is connected with the hot water pipe 5.

It will be obvious that any number of branch pipes may lead from the main hot water pipes as are desirable, this constituting a part of the water-distributing system and not the invention, and therefore not being shown in connected position. The wall of the tapered bore is also formed preferably at a point in alinement with the port or opening 10, and inwardly of the same, with an outlet port or opening 14, for permitting the drainage of the waste water from the cold and hot water pipes when the valve member or plug is in a closed position. A discharge pipe 15 is screwed in the valve casing, and communicates with said last-mentioned port, the purpose of which will be apparent.

The numeral 16 indicates the body of the valve member or plug 17, which is of tapered form to closely fit the tapered bore of the casing, and is formed with a longitudinal slot 18, adapted for registration with the openings of said bore. An inlet port 19, leads from one of the walls of said longitudinal slot 18, and is adapted for registration with one of the openings of the casing when the valve member is turned to cut off the water supply.

A right-angularly disposed extension 20, is formed at the upper or enlarged end of the body 16, of the valve member, and is arranged to have its outer portion extend inward, said portion constituting a finger 21, adapted for engagement with either of two outwardly projecting lugs or stops 22, formed on the valve casing, said finger and stops constituting means for limiting the movement of the valve member, or plug, to permit of the latter being adjusted in either of its two positions. The body of the valve member or plug is prolonged or extended above the finger 21, and a handle 24 is removably fixed to the body by a fastening screw 25, or other equivalent means, or the handle 24 may be extended above the floor 23 as shown in Fig. 1.

In practice, the valve member being arranged in an open position, see Fig. 2, the water in the supply or service pipe 1, is permitted to circulate to the boiler, and from there to any suitable connections, such as a sink, bath-tub or the like. When it is desired to cut off the water supply, the valve member or plug is turned in a position at right-angles to that shown in Fig. 2, to bring the inlet port or opening 19, thereof, in registration with one of the openings of the casing. When the valve member is in this position the water supply is cut off, and the waste water in the hot water pipes passes through the inlet port 10 of the casing through the slot 18, and thence through the outlet port 14, and is discharged through the discharge pipe 15, the cold water passing through the inlet port 19 of the valve member body and also out of the discharge pipe.

Although I have specifically described the combination, construction and arrangement of the several parts of my invention I do not confine myself particularly to such specific combination, construction and arrangement, as I claim the right to make such changes and modification therein as may clearly fall within the scope of my invention, and which may be resorted to without departing from the spirit or sacrificing any of my patentable rights therein.

Having described my invention, what I claim as new and desire to secure by Letters Patent, is:—

A stop and waste cock of the class described, comprising a casing provided in one side with a pair of vertically alined transverse inlet and waste ports, and a revoluble plug having a longitudinal passage and a waste port extending transversely through one wall of said passage, said plug adapted to permit the passage of a fluid in either direction when turned to bring its longitudinal passage into registration with the longitudinal bore of the casing, but adapted to cut off the passage of the fluid when turned to bring its longitudinal passage across or at right angles to said bore of the casing and its waste port in communication with said bore and to permit the waste fluid from one source to pass directly through the longitudinal passage of the plug to the waste port of the casing and the waste fluid from a second source to pass through the inlet port of the casing and the longitudinal passage of the plug to the waste port of the casing.

In testimony whereof I affix my signature, in presence of two witnesses.

FRANK A. STANLEY.

Witnesses:
   W. T. HOLMES,
   U. G. HORN.